March 23, 1948.  I. M. DILLER  2,438,155
PROCESS OF WELDING METAL BODIES BY HIGH FREQUENCY ELECTRIC
HEATING OF DIELECTRIC MATERIAL THEREBETWEEN
Filed Aug. 4, 1945
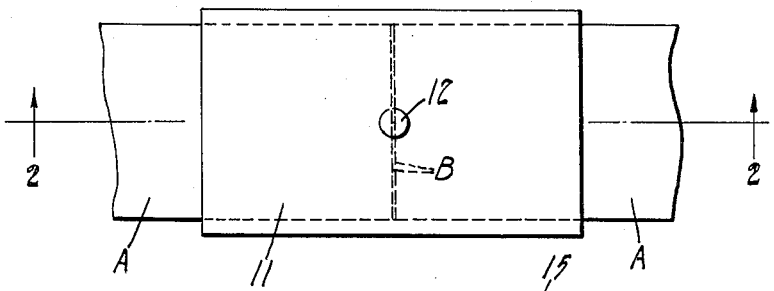
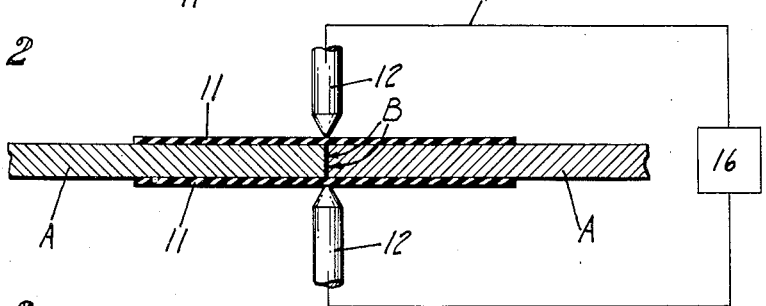
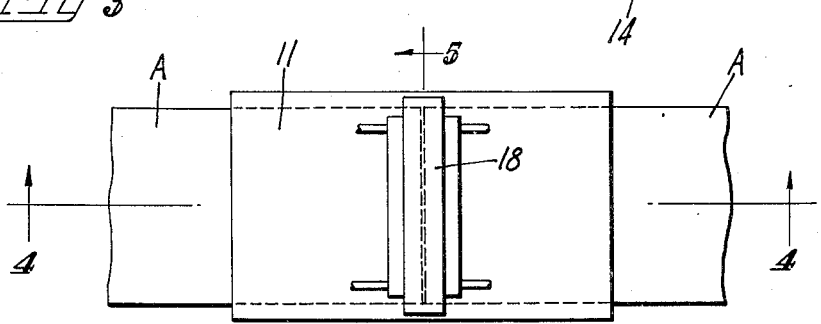
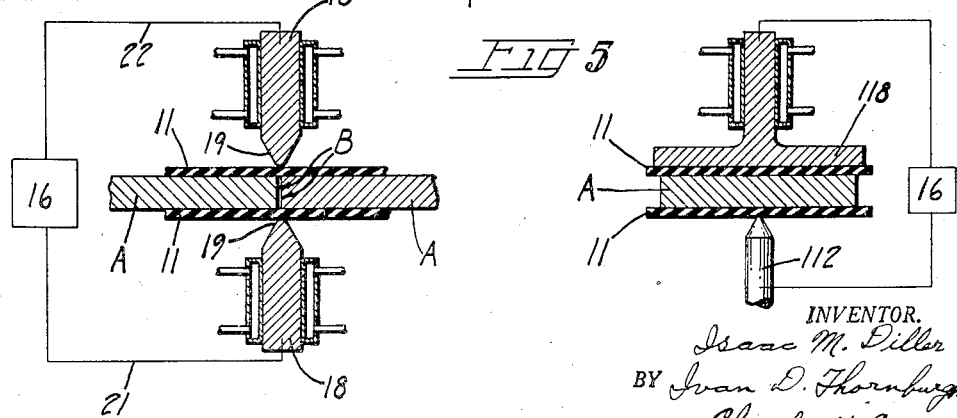
INVENTOR.
Isaac M. Diller
BY Ivan D. Thornburgh
Charles H. Erne
ATTORNEYS Patented Mar. 23, 1948

2,438,155

UNITED STATES PATENT OFFICE 2,438,155

PROCESS OF WELDING METAL BODIES BY HIGH-FREQUENCY ELECTRIC HEATING OF DIELECTRIC MATERIAL THEREBETWEEN

Isaac M. Diller, Glen Ridge, N. J.

Application August 4, 1945, Serial No. 608,905

5 Claims. (Cl. 219—10)

The present invention relates to a new and improved process of welding metals such as metal plates, metal sheets and other metallic bodies and has particular reference to electric butt welding.

In the butt welding of sheet metal it is often desirable to minimize the application of heat so as to eliminate any possible deleterious effect of the heat upon the work pieces adjacent to or away from the joint. In such cases it is desirable to localize the heat to the joint, or rather to the abutting edge portions and only to such edge portions as will fuse to form a uniform, firm, solid, nonporous joint.

In the present invention a high radio frequency (i. e., medium radio frequency to super high radio frequency as classified by F. C. C.) current is employed as a means for heating the juxtaposed or contacting faces of a butt joint substantially to the exclusion of any adjacent metal. Stated broadly, the present invention employs the condenser effect of the material disposed between the two contacting faces of the joint. Visualizing the space between the two juxtaposed or contacting faces as forming a body limited or bordered by the contacting faces, this body consists of abutting more or less minute metallic particles or bodies, voids in the sense of spaces between such abutments which are small gas spaces, and a substantial amount of foreign matter in the form of scale or oxides or other compounds of the metals or other impurities.

In the present invention, it is contemplated that this body or space limited or bordered by the metal edges which are to be welded constitutes a dielectric between a pair of elements which are connected to a source of high frequency. This pair of elements are elements of a condenser whether they be in a form of a more or less pointed, rounded or flat surface electrodes.

Preferably the electrode terminal employed in the present invention should be in the form of a ball or rounded surface.

By means of the present process the formation of pores, interstices or other weak spots within the joint is eliminated. As fusion progresses the formation of pores etc. within the joint function as small condensers and will therefore be heated preferentially by the heat losses within it such as dielectric losses.

It will now be understood that in the practice of the present invention the foreign matter described heretofore found at the interfaces in effect constitute an extremely imperfect dielectric zone. In the present invention therefore high radio frequency current is applied to this imperfect dielectric and the latter is heated by the dielectric losses within this highly imperfect dielectric. It is therefore the dielectric losses within the interfaces or spaces between the edges to be welded that causes the heating of the surface metal to be welded and the fusion of such metal to effect a perfect weld. The porosity of the weld at this stage of the welding operation in effect provides an additional condenser effect at such pores with resultant further dielectric losses within such pores so that the heat is preferably concentrated at points or places where it is most required.

High frequency radio currents have the property of generating heat in dielectric materials. Metal surfaces often bear thin coatings of oxides. This is particularly true of aluminum and other metals. These coatings form an obstacle to obtaining good welds in the methods in use hitherto. In the present invention such coatings, formerly deleterious, are helpful in the generation of heat at the joint.

Thus it will be seen that the present invention employs the peculiarities of high frequency currents in the electric welding of butt joints.

As distinguished from low frequency currents which tend to pass around dielectrics, that is, they tend to find a conductive path on the surface of an insulating body interposed in the path of the current and pass through a metallic body by the shortest route; the currents in the range of frequencies employed in the present invention will pass directly through the dielectric material with the generation of heat therein and will pass over the surface around the corner and to the other surface when a conducting body, such as metal work pieces, is interposed in its path.

The present invention utilizes these peculiarities in that it employs a body of positioning and retaining electrically and thermally insulating material superposed over the joint on both sides so that the high radio frequency current passes through said material in series and through the joint.

The range of frequencies that may be employed in the practice of the present invention varies from a frequency of the order of 1 megacycle to frequencies of the order of 500 megacycles; it being understood, however, that the present invention is not limited to this range of frequencies and that higher frequencies may be employed provided they can generate adequate power for the present process.

A further object of the present invention is to provide a process for electric cast welding of butt joints. In this process the metal immediately adjacent to the joint is encased or confined preferably between a pair of plates or layers of said electrically and thermally insulating material. These plates if desired may be subjected to pressure so as to hold the work pieces firmly between them. As the abutting surfaces of the joint are subjected to the high radio frequency currents of the present invention the metal along the edges becomes fluid but is held in position between the plates until it solidifies. These radio frequency currents in the present invention pass readily through the insulating plates.

Between the two insulating, positioning and retaining plates which are disposed on each side of the work pieces and which may also take the form of a mold or casing and in series therewith is the narrow dielectric body which has been fully discussed and described in an earlier portion of this specification. This is the dielectric body which results from the abutting edges. The insulating plates are preferably chosen to have low dielectric losses and a high dielectric constant. The low dielectric losses minimize the heat losses in the confining plates. By virtue of the high dielectric constant a greater thickness of the material could be used without correspondingly increasing the effect of the distance between the electrode and the work pieces. On the other hand, the dielectric nature of the joint is extremely imperfect so that the heat generating losses therein will be high and welding heat will be generated therein. Such losses as do occur in the positioning and retaining plates will serve to heat them to some degree and further to reduce heat dissipation from the joint.

An object of the invention therefore is the provision of a process of cast welding metals wherein abutting surface areas of metal pieces to be joined are heated locally and welded together with concentrated power derived from a radio frequency electric current.

Another object is the provision of such a process of welding metals wherein the metal of the joint is cast from the parent metal, without the necessity of putting outside metal into the joint, the joint being encased in a mold or between a pair of closely fitting blocks or sheets of poor electrical and thermal conductivity and preferably of high dielectric constant to exclude air from the joint during the welding process.

Another object of the invention is the provision of such a process of cast welding by means of radio frequency electric current which is economical in its execution and is adapted for the welding together of a variety of metallic objects such as heavy metal plates, medium heavy metal plates, thin metal sheets such as tin plate or black iron used in the manufacture of sheet metal containers, chain links and a great many other metal articles.

For a further and more detailed understanding of my process, reference is had to the accompanying drawings and the following description thereof illustrating the process, it being understood that variations thereof falling within the scope of the invention will be apparent to persons skilled in the art.

Referring to the drawings:

Figure 1 is a side view of two pieces of metal to be welded in accordance with the method steps of the instant invention, the view showing principal parts of apparatus for carrying out these steps;

Fig. 2 is a transverse sectional view taken substantially along the line 2—2 in Fig. 1, with parts broken away;

Fig. 3 is a side view of a modified form of the apparatus shown in Figs. 1 and 2, the apparatus being in position adjacent a pair of pieces of metal to be welded together; and Fig. 4 is a transverse sectional view taken substantially along the line 4—4 in Fig. 3, with parts broken away; and Fig. 5 is a modified sectional view taken substantially along the line 5—5 in Fig. 3, with parts broken away.

As a preferred embodiment of the instant invention and in accordance with its method steps, the surface areas of the pieces of metal to be welded together are brought together into adjacent or abutting relation and are encased or confined in a mold or disposed between a pair of closely fitting blocks, plates or sheets of poor electrical and thermal conductivity and preferably of high dielectric constant. While the joint to be welded is in this encased or confined position, high frequency energy is transmitted through the mold, blocks, plates or sheets and thru the dielectric zone formed by the abutting or juxtaposed edges. This electric current heats the surface areas to be united to a liquid or semi-liquid condition but not to a temperature substantially in excess thereof.

The heating will be localized or concentrated in the surface areas to be united, so that while it is possible to obtain complete fusion, the zone of fusion can be restricted and it is not necessary to heat beyond the point of fusion, thereby holding or controlling to a minimum the quantity of heat to be poured into the metal pieces to be joined. In this way stressing of the metal near the joint, or distortion or bowing thereof or misalignment of the edges to be welded if the metal be too light to withstand stressing during welding will be held to a minimum or substantially eliminated.

When the surface areas of the metal pieces to be united are disposed initially in an abutting or juxtaposed position, the fusion of these surface areas effects a union between them and thus welds the pieces together. Optionally, the metal plates to be joined may be pressed together with a comparatively light pressure not amounting to forging pressure during the course of the heating. This pressure is not for the purpose of forging while the metal is in the plastic state but rather for the purpose of aiding the flow of fused metal or substantially fused metal.

The insulating mold or blocks or plates substantially exclude the atmosphere from the joint and effectively confine the fused metal against displacement from the joint, thereby substantially preventing extrusion, burrs, beads or projections at the welded joint and producing a clean, continuous cast weld of the parent metal. Thus the joint is effected by the material of the parent metal pieces themselves without the necessity of adding outside metal during the course of welding. The surface areas to be united fuse and cool in rapid succession throughout the thickness of the metal pieces so that the possibility of creating strains within the metal, and of distorting the metal by the weld, is reduced to a minimum.

Figs. 1 and 2 illustrate one form of apparatus for butt welding a pair of metal plates A in accordance with the instant method invention. The edges B of the plates to be united are placed adjacent each other, preferably in close contact, and enclosed in a mold or as shown in the drawings, are covered with a pair of blocks or sheets 11 of refractory and dielectric or insulating material, such as asbestos, silicon carbide, ceramic, mica, quartz, rutile ($TiO_2$), zirconium oxide or the like which are not electrical conductors in the ordinary sense. Rutile is preferred because of its high dielectric constant and its comparatively high melting point. These blocks 11 preferably are made of material which is as thin as is consistent with required strength and heat resistance. The blocks may be coated with material which will flux the weld and further aid in providing a non-oxidizing atmosphere around the surface areas to be united. Such fluxing agents may be graphite or borax or similar agents which wil prevent the formation of oxides or other such impurities within the weld or which will collect such impurities in case they are formed. Graphite is an example of an agent which prevents such formation and borax which collects such impurities.

Outside of the refractory blocks 11 a pair of electrical conductors or electrodes 12 are disposed on opposite sides of the plates A and in alignment with the surface areas B to be joined as best shown in Fig. 2. These electrical conductors are preferably linked together so as to move in unison in line with each other and are made to traverse the line of weld across the encased plates A. Under some operating conditions, and particularly where the higher frequencies in the given range that border on or include the range of micro-waves are employed, a single electrode in the form of a wave guide or conductor is adequate for the transmission of current to the work.

The electrodes 12 are connected by way of conductors 14, 15 to a source 16 of high frequency electric energy, the frequency being such that the energy is transmitted between the two electrodes 12 and thru the non-conducting refractory blocks 11 and thru the equivalent imperfect dielectric zone between the faces B. Preferably, such a frequency should lie between the range of one megacycle per second and 500 megacycles per second, and the source of this high frequency power is preferably tuned so as to have an impedance which matches that of the work circuit. While this high frequency electric energy is transmitted across the joint to be welded at the surface areas B, the electrodes 12 are moved across the refractory plates along the line of weld at a rate sufficient to fuse the edges of the plates together to complete the weld.

It is possible by this process to weld with the parts in any position and with a minimum of skill. The confining agent may also have as an additional function the prevention of oxidation as in aluminum or the loss of carbon as in steel.

If desired, the weld along the entire length of the joint across the plates A may be made at one time, i. e., simultaneously or in one unit without moving the conductors and for this purpose long stationary conductors or electrodes 18 coextensive with the length of the weld may be provided as shown in the modified form of the apparatus illustrated in Figs. 3 and 4. In this alternate construction the electrical conductors or electrodes 18 extend throughout the length of the joint. These electrodes 18 are connected by conductors 21, 22 to the source 16 of high frequency electric energy such as used for the electrodes 12. In this modified form of the apparatus, the power input is continued until the entire length of the joint has become sufficiently heated for the metal to run together and fuse.

In the modified apparatus shown in Fig. 5, electrode 118 is stationary while the opposed electrode 112 is movable.

The edges B are shown as slightly spaced merely for the purpose of illustration, it being understood that the edges are in practice in close juxtaposition. It should be understood that for the high radio frequency currents employed here the edges are virtually spaced. For when the terminals of the current source are placed on opposite sides of the joint the current will pass between the terminals through the joint along the contacting metal surfaces to be welded and thru the equivalent imperfect dielectric which is a result of the juxtaposition of the edges without molecular contact.

Under the present process it is neither desirable nor necessary to cut back, trim, hone, deoxidize or otherwise prepare the plates at the joint, such as is necessary in other welding methods.

The electrodes may be water cooled as shown in Figs. 3 and 4.

This application is a continuation-in-part of application Serial No. 402,989, filed July 18, 1941, entitled "Welding of metals" (now abandoned).

I claim:

1. The process of electric welding the edges of metal bodies which comprises juxtaposing the edges to be welded and establishing between the edges a zone having the qualities of a highly imperfect dielectric and passing through said zone an electric current having a frequency of the order of at least one megacycle per second, thereby heating the material in the zone by dielectric losses therein to fuse the edges into a weld.

2. The process of cast welding metal sheets or the like, which comprises bringing the edges thereof to be joined into contact to form a dielectric zone along the seam therebetween, placing a pair of bodies of electrical insulating and refractory material on opposite faces of said sheets bridging the seam therebetween and engaging and confining the dielectric zone to prevent the displacement of heated metal, positioning a pair of electrodes in contact with said bodies on opposite sides of and in alignment with said zone, conducting electric current at least of the order of one megacycle per second to said electrodes and passing the current through the dielectric zone to heat the same substantially only by dielectric heating to fuse the edge material of said sheets into a cast welded joint.

3. The process set forth in claim 2 in which the bodies interposed between the electrodes and the dielectric zone have a relatively high dielectric constant.

4. The process set forth in claim 2 in which at least one electrode has a dimension smaller than the length of the seam and moving the same therealong.

5. The process set forth in claim 2 in which the electrodes are smaller than the length of the seam and moving the same therealong in unison.

ISAAC M. DILLER.

REFERENCES CITED

The following references are of record in the file of this patent:

UNITED STATES PATENTS

| Number | Name | Date |
|---|---|---|
| 1,548,204 | Modesta | Aug. 4, 1925 |
| 1,809,468 | Bornand et al. | June 9, 1931 |
| 2,205,425 | Leonard | June 25, 1940 |
| 2,281,805 | Schenk | May 5, 1942 |
| 2,287,540 | Vang | June 23, 1942 |
| 2,287,544 | Vang | June 23, 1942 |
| 2,317,281 | Linguist | Apr. 20, 1943 |
| 2,367,715 | Chapman | Jan. 23, 1945 |